Patented July 8, 1924.

1,500,993

UNITED STATES PATENT OFFICE.

RICHARD OWEN JONES, OF CRICKLEWOOD, LONDON, ENGLAND, ASSIGNOR TO COURT-AULDS LIMITED, OF LONDON, ENGLAND, A COMPANY OF GREAT BRITAIN.

MANUFACTURE AND PRODUCTION OF CAUSTIC SODA.

No Drawing.   Application filed June 9, 1922.   Serial No. 567,201.

*To all whom it may concern:*

Be it known that I, RICHARD OWEN JONES, a subject of the King of Great Britain, residing at 21 Hoveden Road, Cricklewood, London, England, have invented new and useful Improvements in or Connected with the Manufacture and Production of Caustic Soda, of which the following is a specification.

The usual methods of preparing caustic soda on a manufacturing scale from sodium carbonate by means of lime, rarely produce solutions of higher concentration than 8 per cent. It has long been known that the reaction

is reversible, and that the higher the concentration of the sodium carbonate the lower will be the proportion converted into caustic soda. Consequently, it has been the practice to work towards solutions of approximately 8 per cent strength giving a conversion of about 92 per cent of that theoretically obtainable. Many attempts have been made to raise this equilibrium point so that more concentrated solutions of equal purity could be prepared, but hitherto these attempts have been without success.

According to the present invention, solutions containing up to about 20 per cent of caustic soda can be obtained.

When solutions of increasing concentration of sodium carbonate are causticized, the concentration of the caustic soda eventually reaches a limit, after which further addition of sodium carbonate has no effect upon the yield of the caustic soda, any excess of sodium carbonate added over and above this limit of concentration being thrown out of solution in the form of the insoluble double compound of calcium carbonate and sodium carbonate. If, however, the liquor be separated by filtration from the precipitated calcium carbonate, and the said liquor be treated with an additional quantity of sodium carbonate and lime, a further conversion to caustic soda takes place, the equivalent quantity of the insoluble double compound of sodium carbonate and calcium carbonate being formed at the same time.

In this process, therefore, the causticizing is carried out in two stages, as represented by the following equations:—

(I) 

(II) 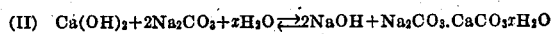

In the first stage the concentrations are so chosen that little, or none, of the aforesaid double carbonate compound is formed and, after the completion of this stage, the liquor is filtered from the precipitate, which consists mainly of calcium carbonate and in the second stage more sodium carbonate and lime are added to this liquor when a further conversion to caustic soda takes place in accordance with the foregoing equation II. In this manner a liquor is readily obtained containing about 20 per cent caustic soda and about 6 per cent sodium carbonate.

The aforesaid double compound after separation, for instance, by filtration, is readily decomposed by means of water furnishing a solution of sodium carbonate which can be employed for the production of caustic soda.

The following is an example of the manner in which this invention may be performed, but the invention is not limited to this example. The parts are by weight.

660 parts of sodium carbonate are dissolved in 2000 parts of water and the solution heated to 90° centigrade. The liquor is stirred whilst 300 parts of quicklime are added gradually the heat of the reaction being sufficient to maintain the requisite temperature. When the reaction has subsided, the heating is continued, the mixture being kept boiling for an hour, keeping the volume approximately constant. The resulting solution has a specific gravity of at least 1.225. The liquor is filtered off from the calcium carbonate and contains approximately 14.5 per cent of caustic soda and 7.8 per cent of sodium carbonate.

12 parts of sodium carbonate are added to each 100 parts of the hot filtered liquor and the causticizing is carried out, in the manner hereinbefore described, by the addition of 4 parts of quicklime and boiling for one hour. The mixture is stirred whilst cooling to between 20° and 30° centigrade. The resulting solution has a specific gravity of at least 1.25. The liquor separated from the precipitate (containing the double carbonate of calcium and sodium) will contain approximately, caustic soda from 19 to 20 per cent and sodium carbonate from 5 to 6 per cent depending upon the rate of cooling of the liquor.

What I claim is:—

1. The manufacture of comparatively concentrated solutions of caustic soda from sodium carbonate by causticizing with lime as completely as possible a solution containing about 20 per cent of sodium carbonate, then filtering off the liquor, then dissolving in this liquor about a further 10 per cent of sodium carbonate, and then causticizing the solution again as completely as possible with lime, whereby, on cooling, a liquor is obtained which contains at least 18 per cent of caustic soda and some sodium carbonate.

2. The manufacture of caustic soda from sodium carbonate which comprises dissolving approximately 660 parts, by weight, of sodium carbonate in approximately 2000 parts, by weight, of water, heating the solution, stirring into it approximately 300 parts, by weight, of quicklime, boiling and adding to the mixture to keep its volume approximately constant, filtering off the liquor, adding thereto approximately 12 parts, by weight, of sodium carbonate to each 100 parts, by weight, of the hot liquor, and approximately 4 parts, by weight, of quicklime, boiling the mixture, followed by cooling whilst stirring, and then separating the liquor from the precipitate.

In testimony whereof I have signed my name to this specification in the presence of two subscribing witnesses.

RICHARD OWEN JONES.

Witnesses:
SIDNEY S. WAPPER,
GIBERT HARDING.